W. C. MARGEDANT.
Molding-Machines.

No. 149,495.

4 Sheets--Sheet 1.

Patented April 7, 1874.

Witnesses:
Solon C. Kemon
Edw. W. Benton

Inventor:
Wm. C. Margedant
Per ——— 
Attorneys.

W. C. MARGEDANT.
Molding-Machines.

No. 149,495.

4 Sheets--Sheet 2.

Patented April 7, 1874.

Witnesses:
G. Mathys
John C. Kenon

Inventor:
Wm. C. Margedant
Per
Attorneys.

W. C. MARGEDANT.
Molding-Machines.
No. 149,495. Patented April 7, 1874.
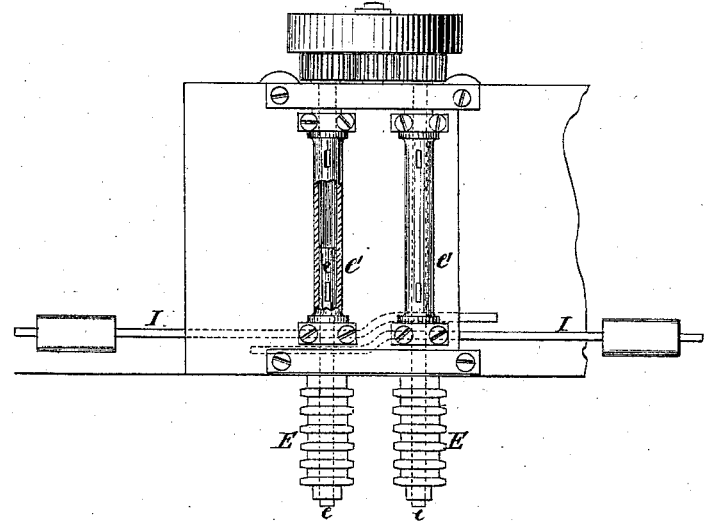
Fig. 5.
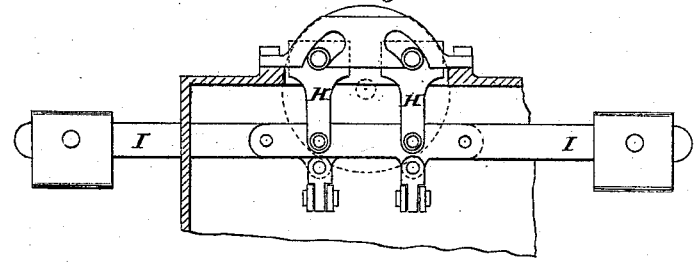
Fig. 6.
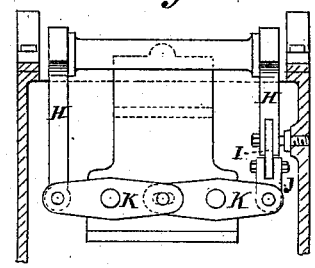
Fig. 7.
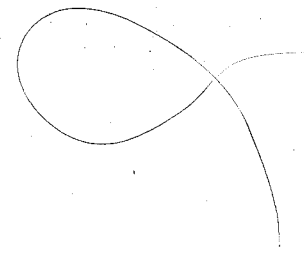
WITNESSES:
G. Matthys
Solon C. Kemon
INVENTOR:
Wm. C. Margedant
BY
ATTORNEYS.

W. C. MARGEDANT.
Molding-Machines.
No. 149,495.
4 Sheets--Sheet 4.
Patented April 7, 1874.
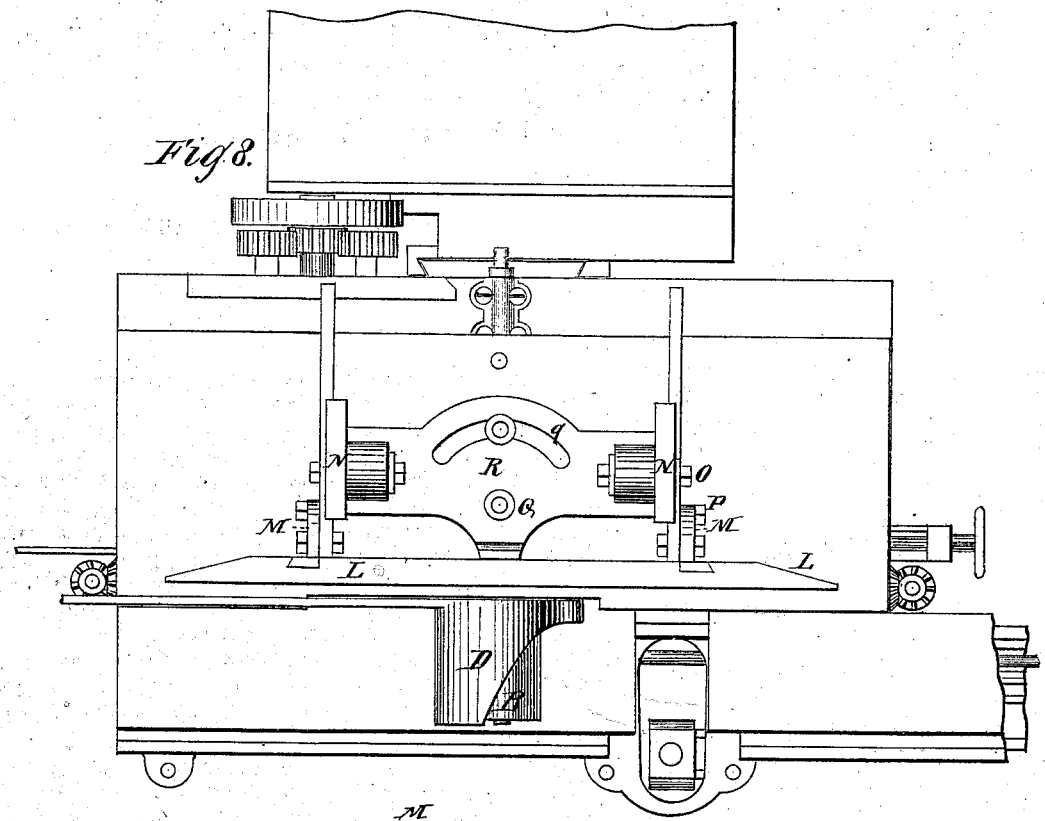
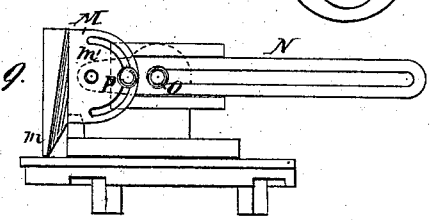
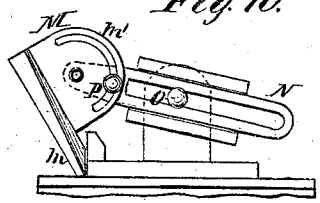
WITNESSES:
INVENTOR:
BY
ATTORNEYS.

UNITED STATES PATENT OFFICE.

WILLIAM C. MARGEDANT, OF HAMILTON, OHIO, ASSIGNOR TO BENTEL, MARGEDANT & CO., OF SAME PLACE.

IMPROVEMENT IN MOLDING-MACHINES.

Specification forming part of Letters Patent No. 149,495, dated April 7, 1874; application filed March 5, 1874.

CASE D.

*To all whom it may concern:*

Be it known that I, WILLIAM C. MARGEDANT, of Hamilton, in the county of Butler and State of Ohio, have invented a new and Improved Molding-Machine; and I do hereby declare that the following is a full, clear, and exact description of the same, reference being had to the accompanying drawing forming a part of this specification.

The invention relates to that class of woodworking machines known to the public as molding-machines, and which are provided with one overhanging cutter-head, an inside, and sometimes an outside, side head.

The invention will first be fully described, and then pointed out in the claims.

Figure 1:
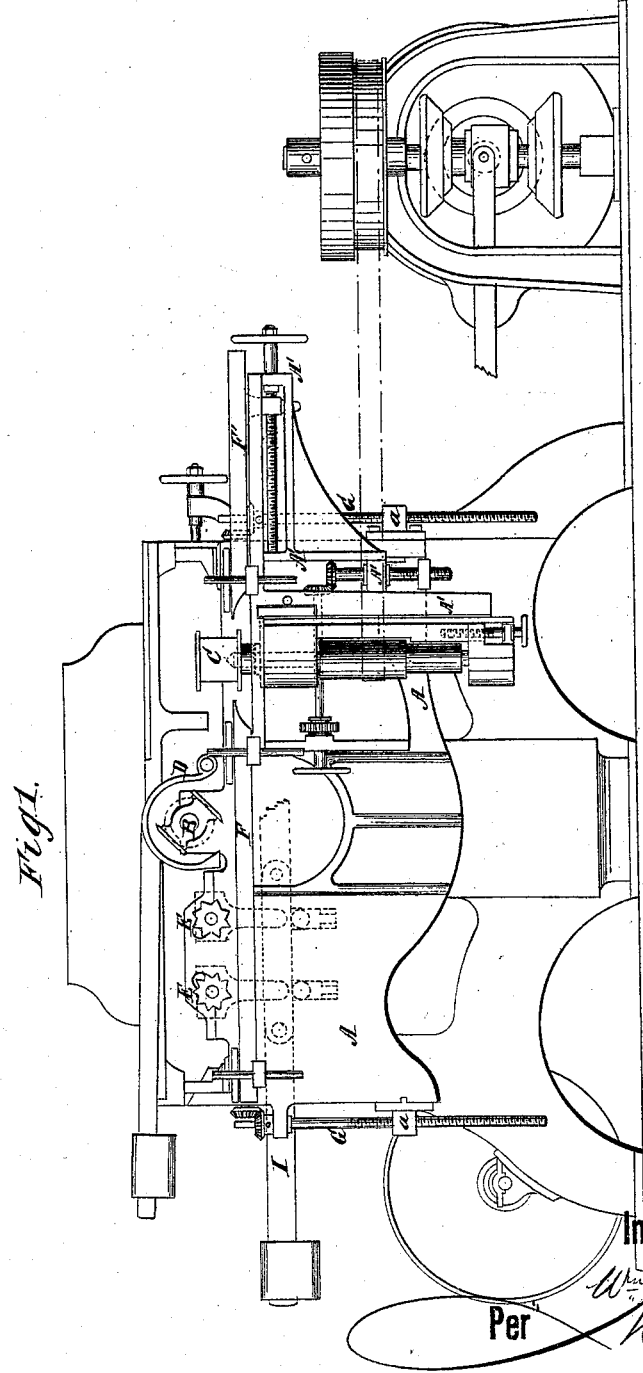
Figure 2:
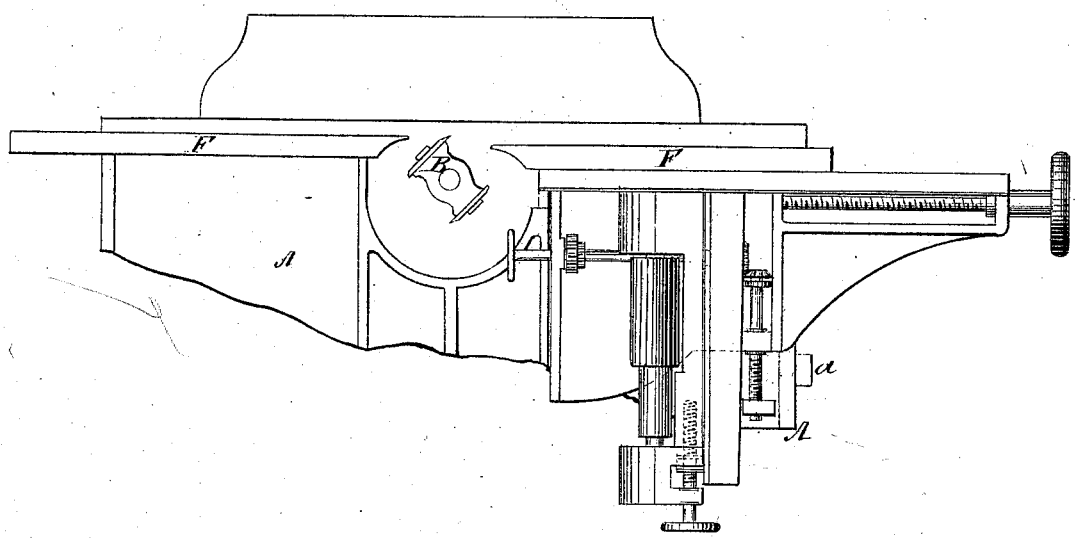
Figure 3:
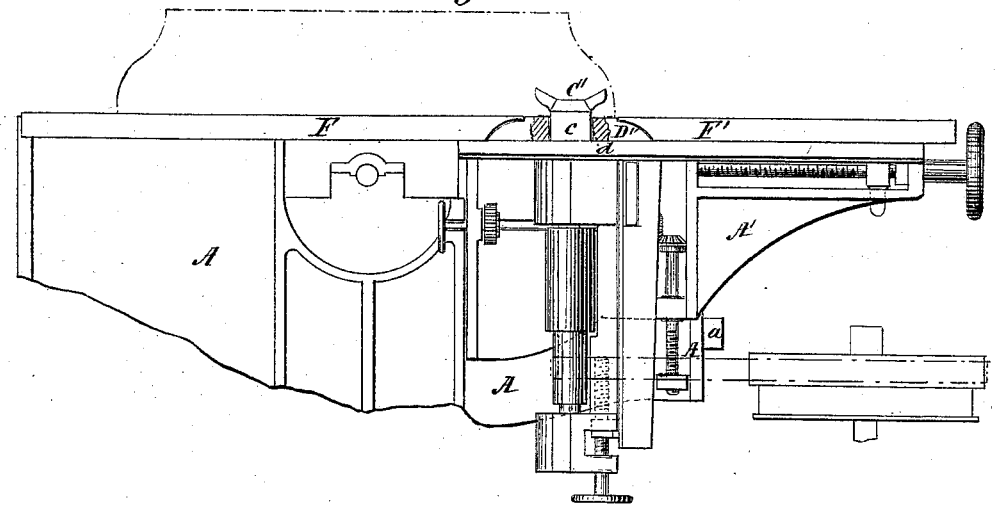
Figure 4:

Figure 1 is a side elevation of the machine; Figs. 2 and 3, side elevations of a portion of the machine, showing the arrangement of parts as adjusted for planing and cutting moldings; Fig. 4, a side view of sandpapering-tool; Fig. 5, a plan view, partly broken away, of the feed-rollers; Figs. 6 and 7, respectively, a longitudinal and cross-section, to show my mode of adjusting these rolls; Fig. 8, a plan view; and Figs. 9 and 10, cross-sections, showing the fence and illustrating its adjustments.

A represents the frame of an adjustable bed or platen, of which the table whereon the timber is placed forms a part. B is a rotary cutter-head, that revolves on a horizontal shaft; and C, a side head, that revolves on a vertical shaft. There are sometimes a top and bottom head with two side heads on the same machine. D is the pivoted hood that covers cutter-head B. E E are the usual feed-rolls, by which the timber is gradually carried over the table, beneath the rotary cutter B. Thus far, all is old.

Previous to my invention, these machines have been used to plane wood on one, two, three, and four sides; or to stick, plane, or cut straight moldings of different widths; or to make tonguing, grooving, or rolling joints.

Instead of making the bed or platen in one piece, I construct it in two parts, F F', allowing them to slide back and forward on the frame, so as to allow the operation of side heads C, while I make the frame adjustable by means of two long screws, G G, working in threaded sockets of the lugs $a\ a$, Fig. 1.

By drawing back the sections F F' and moving rolls E E and side head C, the frame A may be raised so as to bring the said table-sections above the periphery of head B, while the section F' is made separately adjustable in altitude on the frame A, to regulate the thickness of the surface-planing.

C', Fig. 3, is a shaper-head, having the shank $c$, that fits into aperture $d$ of the filling-piece D', that slides under the opposite edges of the sections F F', and is held by them in position.

The change is clearly shown in Fig. 2 of drawing, while Fig. 3 exhibits the same arrangement of parts, in which may be employed a molding cutter, shaper, or the sandpapering-tool shown in Fig. 4.

My improvement on this class of machines enables the operator not only to do all the different work heretofore done on them, but to use this machine for many operations on wood which could not be done advantageously before.

Some of the molding-machines heretofore used are constructed to operate upon the wood below the cutter-head, while the table is lowered, by means of screws or otherwise, below the cutting-line of the cutter-head. There have been devices to attach, with screws or clamps, special parts to the table, so as to make use of the upper cutting-line of the cutter-head for planing material of circular shape on the inside or radial line; but, to the best of my knowledge, there are no beds or tables that permit the whole plate to be raised above the horizontal cutter-head, carrying with it the side or matcher heads, to be used independently or in connection with the horizontal cutter-head. It is obvious that when the bed or table is raised above the cutting-line of the cutter-head, and parts at the proper place to permit the removal, insertion, and operation of different heads and other cutting-tools, many of the operations on wood, as straight or bevel planing, gaining, rabbeting, tonguing, grooving, and cutting moldings, can all be done.

If that part of the table which is back of the cutting-head is kept in a true elevation with respect to the cutting-line of the revolving horizontal cutter-head, and that part of the bed or table which is in front of the revolving cutter-head is lowered below the cutting-line to a depth required, the bed may be used to plane material true and out of wind. The side or matcher head, being raised and lowered simultaneously with the bed or table, can, in its elevated position, be used advantageously for cutting forms, such as moldings, &c. I can also change in a moment the direction of motion, so as to cut always with the grain of the wood, and change the speed, by means of a cone-pulley, for the purpose required.

By removing the cutter-head C and inserting a plate which, on its upper side, is covered with sand-paper, (see Fig. 4,) the side head can be used as a sandpapering-machine, adjustable, at the will of the operator, for any common height above the bed or table.

In order to make the rolls E E readily removable, when the table F F' is to be raised, I make their arbors $e$ $e$ to slide back in sockets $e'$ $e'$; and in order to enable these sockets $e'$ to rise always in the slots to the same altitude along their whole length, I provide the yokes H, weighted levers I, connections J, and end-slotted levers K K, arranged as shown in Figs. 5 and 6 of drawing. By this means the feed-rolls E E must rise equally and parallel over the timber, exert a uniform pressure thereon, and necessitate a straight accurate feed. L represents the fence, which is usually employed in connection with the wood that is being operated on, and to gage the cut that is to be made. M M are plates, having the flange $m$ and arc-slot $m'$, while N are slotted plates, adjustable forward and backward on the clamping-bolts O, and to which the plates M are adjusted in a vertical plane on a clamp-bolt, P. Q is the frame that holds the two plates N N, and is itself adjustable, by means of the clamp-bolt R and arc-slot $g$, in a horizontal plane. I am thus enabled to advance the fence, and to place it at any horizontal or vertical angle, according to the cut of molding that is desired in either direction from a vertical line.

Having thus described my invention, what I claim is—

1. The sticker-bed consisting of vertically-adjustable main frames A, secondary frame A', adjustable thereon, and the two sections F F', both of the latter adjustable horizontally, all substantially in the manner described.

2. The combination, in a planing-machine, with feed-roll E and arbors $e$, of hollow sockets $e'$, the former being thus allowed to slide in and out of the latter, as and for the purpose set forth.

3. The combination of yokes H, weighted levers I, connections J, and end-slotted levers K K, the feed-rolls E E to remain in a horizontal plane at all altitudes to which they may be raised by the subjacent timber.

4. The filling-piece D', sliding under the sections F F', and apertured to receive the shank $c$ of head, as set forth.

WM. C. MARGEDANT.

Witnesses:
SOLON C. KEMON,
CHAS. A. PETTIT.